United States Patent
Raghavan et al.

(10) Patent No.: US 11,848,730 B2
(45) Date of Patent: Dec. 19, 2023

(54) METHODS FOR FEEDBACK OF METRICS ASSOCIATED WITH REDUCED CAPABILITY ANTENNA MODULES IN MILLIMETER WAVE SYSTEMS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/644,686

(22) Filed: Dec. 16, 2021

(65) Prior Publication Data
US 2023/0198584 A1 Jun. 22, 2023

(51) Int. Cl.
*H04B 7/0456* (2017.01)
*H04B 17/309* (2015.01)
(Continued)

(52) U.S. Cl.
CPC ............ *H04B 7/0478* (2013.01); *H01Q 5/49* (2015.01); *H04B 17/309* (2015.01); *H04W 76/14* (2018.02)

(58) Field of Classification Search
CPC ...... H04B 7/0478; H04B 17/309; H01Q 5/49; H04W 76/14
See application file for complete search history.

(56) References Cited

U.S. PATENT DOCUMENTS 6,259,685 B1 7/2001 Rinne et al.
11,528,631 B2 * 12/2022 Taherzadeh Boroujeni ................ H04W 80/02
(Continued)

FOREIGN PATENT DOCUMENTS

| EP | 1542488 A1 | 6/2005 | |
| WO | WO-2021028115 A1 * | 2/2021 | ........... H04B 7/0617 |
| WO | WO-2021229026 A1 | 11/2021 | |

OTHER PUBLICATIONS

Huawei et al ("Panel based UL beam selection" 3GPP Draft R1-1903975, 3GPP TSG RanWGI Meeting #96bis, Xi'an, China Apr. 8-12, 2019). (Year: 2019).*
(Continued)

*Primary Examiner* — Jaison Joseph
(74) *Attorney, Agent, or Firm* — Norton Rose Fulbright US LLP

(57) ABSTRACT

Systems, methods, and devices for wireless communication that support mechanisms for signaling metrics associated with antenna modules of a UE in a wireless communication system. A user equipment (UE) determines one or more metrics associated with at least one antenna module of the UE. The UE transmits a message including the one or more metrics associated with at least one antenna module of the UE (e.g., to a base station or to another sidelink UE). In certain aspects, the message including the one or more metrics is transmitted to the base station during an initial establishment of a communication session between the UE and the base station. In some aspects, the UE transmits the message including the one or more metrics as a broadcast message, in a radio resource control (RRC) message, and/or in a medium access control (MAC)-control element (CE) message.

32 Claims, 7 Drawing Sheets

(51) Int. Cl.
*H01Q 5/49* (2015.01)
*H04W 76/14* (2018.01)

(56) References Cited

U.S. PATENT DOCUMENTS

| | | | |
|---|---|---|---|
| 2003/0128673 A1 | 7/2003 | Lee et al. | |
| 2015/0010099 A1* | 1/2015 | Lin | H04B 7/0404 |
| | | | 375/267 |
| 2015/0120189 A1* | 4/2015 | Giometti | H04W 72/0453 |
| | | | 342/450 |
| 2015/0312919 A1* | 10/2015 | Lee | H04L 5/0048 |
| | | | 370/252 |
| 2018/0006703 A1* | 1/2018 | Kim | H04W 72/082 |
| 2018/0063693 A1 | 3/2018 | Chakraborty et al. | |
| 2019/0028167 A1* | 1/2019 | Chang | H04B 7/063 |
| 2019/0109629 A1* | 4/2019 | Park | H04B 7/0456 |
| 2020/0029274 A1 | 1/2020 | Cheng et al. | |
| 2020/0037212 A1* | 1/2020 | Ramachandra | H04W 36/0088 |
| 2020/0267536 A1 | 8/2020 | Zhou et al. | |
| 2020/0358585 A1 | 11/2020 | Ryu et al. | |
| 2021/0068077 A1* | 3/2021 | Raghavan | H04W 72/02 |
| 2022/0247474 A1* | 8/2022 | Rune | H04B 7/024 |
| 2022/0394615 A1* | 12/2022 | Maleki | H04B 17/309 |

OTHER PUBLICATIONS

International Search Report and Written Opinion—PCT/US2022/081685—ISA/EPO—dated Apr. 18, 2023.

* cited by examiner

METHODS FOR FEEDBACK OF METRICS ASSOCIATED WITH REDUCED CAPABILITY ANTENNA MODULES IN MILLIMETER WAVE SYSTEMS

TECHNICAL FIELD

Aspects of the present disclosure relate generally to wireless communication systems, and more particularly, to signaling metrics associated with antenna modules of a UE.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining one or more metrics associated with at least one antenna module of the UE, and transmitting, to a base station, a message including the one or more metrics associated with the at least one antenna module of the UE.

In an additional aspect of the disclosure, a method of wireless communication performed by a base station includes receiving, from a UE, a message including one or more metrics associated with at least one antenna module of the UE, and performing an activity based on the one or more metrics associated with the at least one antenna module of the UE.

In an additional aspect of the disclosure, an apparatus (e.g., a UE) includes one or more processors and a memory coupled to the at least one processor. The memory and the one or more processors are configured to determine, by a UE, one or more metrics associated with at least one antenna module of the UE, and to transmit, to a base station, a message including the one or more metrics associated with the at least one antenna module of the UE.

In an additional aspect of the disclosure, an apparatus (e.g., a base station) includes one or more processors and a memory coupled to the at least one processor. The memory and the one or more processors are configured to receive, by a base station from a UE, a message including one or more metrics associated with at least one antenna module of the UE, and to perform an activity based on the one or more metrics associated with the at least one antenna module of the UE.

In an additional aspect of the disclosure, a non-transitory computer-readable medium stores instructions that, when executed by a processor, cause the processor to perform operations. The operations include determining, by a UE, one or more metrics associated with at least one antenna module of the UE, and transmitting, to a base station, a message including the one or more metrics associated with the at least one antenna module of the UE.

In an additional aspect of the disclosure, a non-transitory computer-readable medium stores instructions that, when executed by a processor, cause the processor to perform operations. The operations include receiving, by a base station from a UE, a message including one or more metrics associated with at least one antenna module of the UE, and performing an activity based on the one or more metrics associated with the at least one antenna module of the UE.

In an additional aspect of the disclosure, an apparatus includes means for determining, by a UE, one or more metrics associated with at least one antenna module of the UE, and means for transmitting, to a base station, a message including the one or more metrics associated with the at least one antenna module of the UE In an additional aspect of the disclosure, an apparatus includes means for receiving, by a base station from a UE, a message including one or more metrics associated with at least one antenna module of the UE, and performing an activity based on the one or more metrics associated with the at least one antenna module of the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
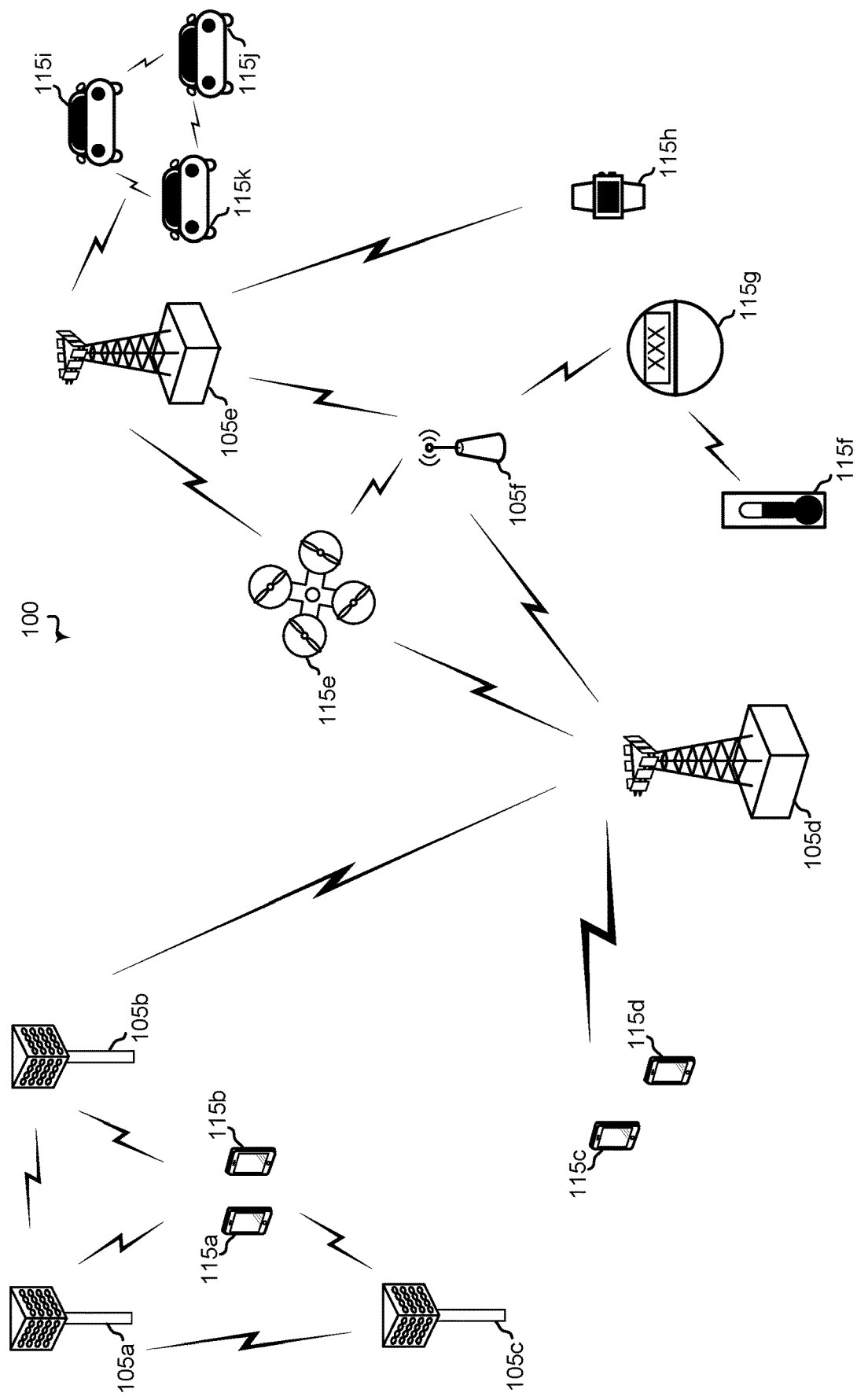
FIG. 1 is a block diagram illustrating details of an example wireless communication system according to one or more aspects.

The detailed description set forth below, in connection with the appended drawings is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
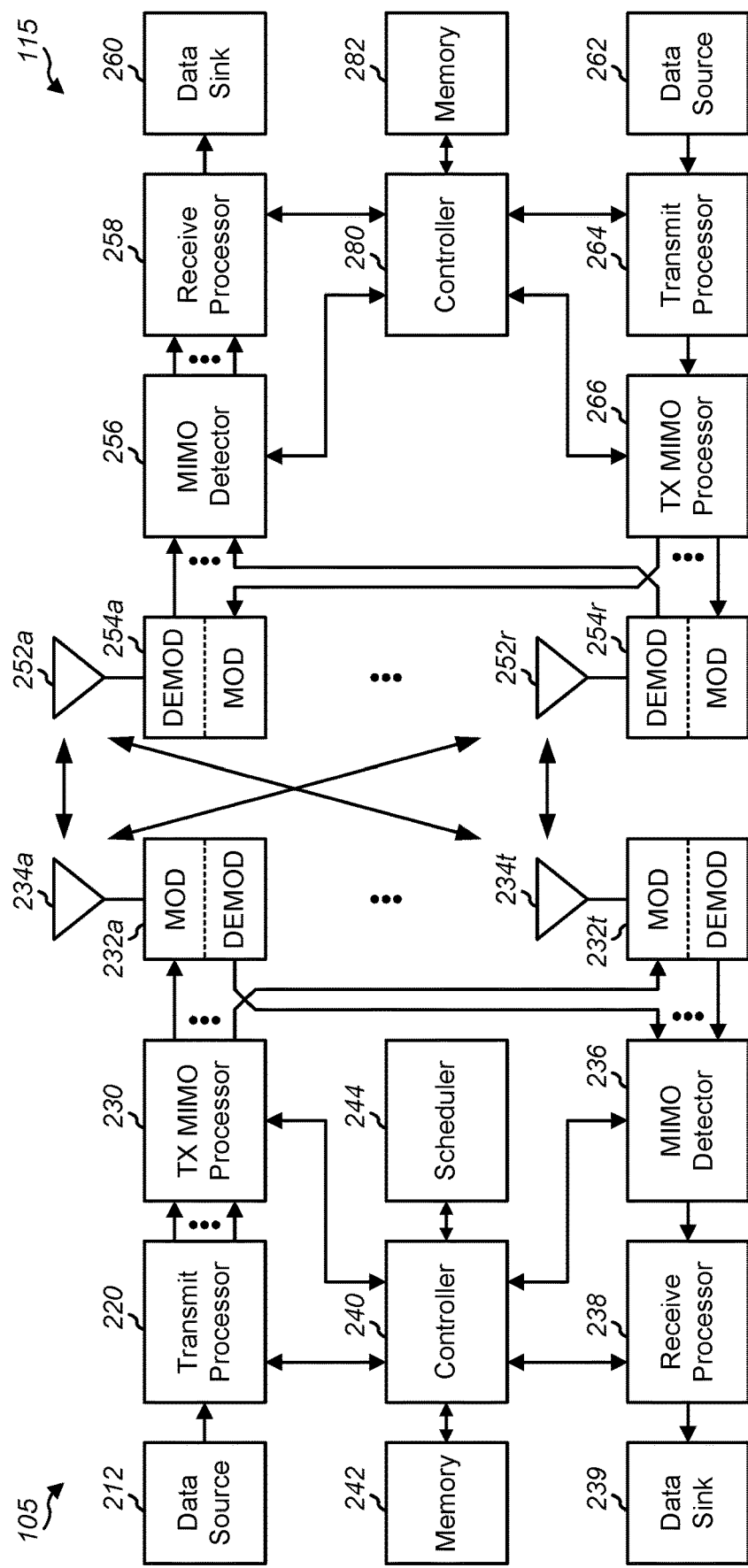
FIG. 2 is a block diagram illustrating examples of a base station and a user equipment (UE) according to one or more aspects.

FIG. 2 is a block diagram illustrating examples of base station 105 and UE 115 according to one or more aspects.

Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc.

The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current implementations of wireless communication systems, base stations and UEs may be configured with multiple antennas to facilitate the wireless communications. This is especially the case in mmWave systems. In these systems, beamforming may be used in order to bridge the link budget for these systems, and multiple antenna modules or panels (within each antenna module) may include a set of antenna elements that may be co-phased in beamforming via the use of a correct set of phase shifter and amplitude controls across the antenna elements. Using multiple antenna modules may enable a base station and/or a UE to meet spherical coverage requirements with or without hand/body blockage, as well as to provide robustness with beam switching over these antenna modules.

In particular, currently, most premium and high-tier UEs may be configured with multiple antenna modules that may include up to multiple antenna modules (e.g., three antenna modules in some implementations), a module placed on one or more edges of the UE. In these UEs, each antenna module may be typically made of an antenna array that is configured as a 4×1 dual-polarized antenna array. However, as mmWave systems evolve, a greater diversity of new antenna modules with different antenna array configurations may be used. For example, a greater or lesser number of antenna elements may be used in an antenna array or antenna module. In some cases, placement of the antenna modules within a UE may be considered an manufacturing optimization by the original equipment manufacturer (OEM) that may lead to different beamforming capabilities and performance.

In some current implementations, such as in reduced capability implementations, low-cost antenna components may be used in UEs. These low-cost antenna components may include a lesser number of antenna modules (e.g., instead of the three modules on three edges configuration of premium-tier UEs). These low-cost antenna components may implement, for example, antenna module(s) including various configurations of antenna arrays (e.g., an antenna module including a 1×5 dual-polarized patch array, an antenna module including a 2×4 dual-polarized patch array, an antenna module including 1×4 dual-polarized patch and 1×4 end-fire dipole arrays, an antenna module including 2×4 dual-polarized patch and 1×4 end-fire dipole arrays, etc.). However, despite the different configurations of the various antenna modules, currently, there is a lack of a mechanism to signal metrics associated with antenna modules configured in a UE.

Various aspects of the present disclosure are directed to systems and methods that support mechanisms for signaling metrics associated with antenna modules of a UE in a wireless communication system. In certain aspects, a UE may determine one or more metrics associated with at least one antenna module of the UE. The UE may then transmit a message including the one or more metrics associated with at least one antenna module of the UE. In certain aspects, the UE may transmit the message including the one or more metrics to a base station. In alternative or additional aspects, the UE may transmit the message including the one or more metrics to another UE over a sidelink. In certain aspects, the UE may transmit the message including the one or more metrics as a broadcast message in an uplink transmission to the base station or in a sidelink transmission to another UE. In some aspects, the message including the one or more metrics may be transmitted to the base station during an initial establishment of a communication session between the UE and the base station. The message may be sent as a radio resource control (RRC) message or as a medium access control (MAC)-control element (CE).

In some aspects, the one or more metrics associated with the at least one antenna module may include a number of antenna modules configured for the UE, the placement of the antenna modules within the UE, a type of antenna elements in each of the at least one antenna module, a number of antenna ports configured for the UE, a number of antenna elements in each subarray of each antenna module, a peak effective isotropic radiated power (EIRP) realized with a number of combination of antenna modules, a boresight direction of each subarray, a nature of analog beamforming codebook feedback, a peak transmission and reception power consumed when using each of the at least one antenna module corresponding to the peak EIRP, whether the UE operates on battery power or a fixed power source, and/or a type of thermal management.

In some aspects, the base station may use the one or more metrics associated with at least one antenna module of the UE to perform various functions. For example, the base station may use the one or more metrics for network optimization, as well as to reduce system overheads and feedback requirements. The base station may further assist the UE based on the one or more metrics associated with at least one antenna module of the UE, such as by enhancing reference signal allocation, power and/or rate control, etc.

Figure 3:
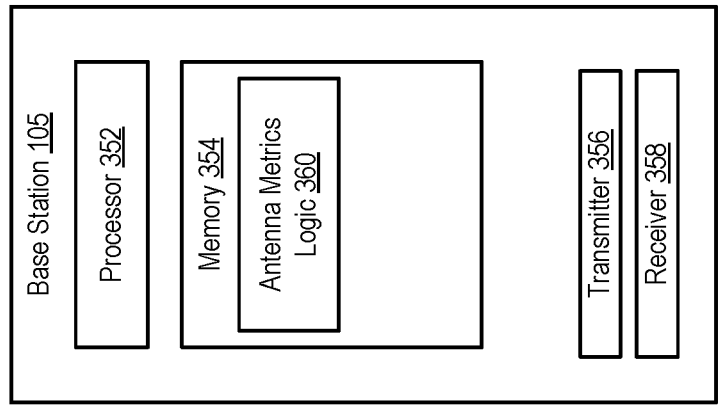
FIG. 3 is a block diagram illustrating an example wireless communication system that supports mechanisms for signaling metrics associated with antenna modules of a UE in a wireless communication system according to one or more aspects.
Figure 3:
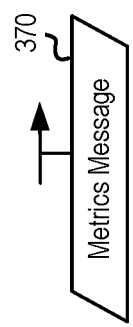
Figure 3:
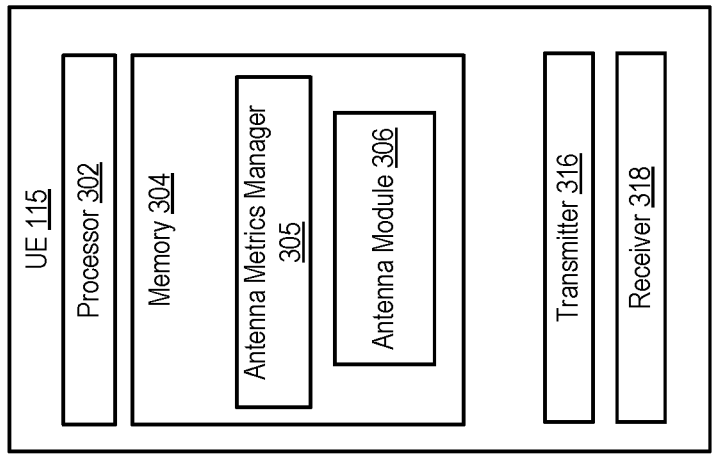

FIG. 3 is a block diagram of an example wireless communications system 300 that supports mechanisms for signaling metrics associated with antenna modules of a UE in a wireless communication system according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more antenna modules 306 (hereinafter referred to collectively as "antenna module 306"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store antenna metrics manager 305. In aspects, antenna metrics manager 305 is configured to perform operations for determining one or more metrics associated with antenna module 306 of UE 115 in accordance with aspects of the present disclosure. As described herein, the one or more metrics associated with antenna module 306 of UE 115 may be transmitted to a base station and/or to other UEs to facilitate communications between UE 115 and the base station and/or the other UEs.

Antenna module 306 may include one or more antenna modules configured for UE 115. In some aspects, antenna module 306 may include a plurality of antenna modules placed on the edges of UE 115. In some aspects, antenna module 306 may comprise one or more subarrays including one or more antenna elements. The one or more subarrays may be configured in different layouts, such as a 1×4, 1×5, 2×4, etc. The antenna elements may be of different types (e.g., dual-polarized patch, end-fire dipole, etc.).

Transmitter 316 is configured to transmit reference signals, control information and data to one or more other devices, and receiver 318 is configured to receive reference signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store antenna metrics logic 360. In aspects, antenna metrics logic 360 may be configured to, based on one or more metrics associated with at least one antenna module of UE 115, perform an process in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network implementing mmWave communications. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, UE 115 may determine one or more metrics associated with antenna module 306 of UE 115. In aspects, antenna module 306 may include one or more antenna modules. For example, antenna module 306 may include a single antenna module including one or more subarrays of antenna elements, or a plurality of antenna modules, each antenna module including one or more subarrays of antenna elements. The one or more subarrays may include a plurality of antenna elements laid out in a particular arrangement. For example, a 1×4 subarray of antenna elements may include a single row of four antenna elements, a 1×5 subarray of antenna elements may include a single row of five antenna elements, a 2×4 subarray of antenna elements may include two rows of four antenna elements in each row, etc. As noted above, the antenna elements may include antenna elements of various types (e.g., dual-polarized patch, end-fire dipole, etc.).

In aspects, the one or more metrics associated with antenna module 306 determined by UE 115 may include a number of antenna modules configured for UE 115, as well as the placement of the antenna modules within UE 115. For example, UE 115 may determine a number of antenna modules in antenna module 306 and where each of the antenna modules is placed within UE 115. In one example, antenna module 306 may include a single antenna module placed on one of the edges of UE 115. In another example, antenna module 306 may include two antenna modules placed on two different edges of UE 115, or placed on the same edge of UE 115. Other example configurations may include three antenna modules, with each antenna module placed on a different edge, or more antenna modules placed in various edges of UE 115. It will be appreciated that these examples are for illustrative purposes and should not be construed as limiting in any way. UE 115 may include a placement identifier identifying a placement of each antenna module. For example, a first identifier may indicate that an antenna module is placed on a first edge (e.g., long edge, short edge, back face, etc.) of UE 115, whereas a second identifier may indicate that an antenna module is placed on a second edge of UE 115. In this manner, the placement identifier may serve to indicate the placement and/or location of an associated antenna module within UE 115. In some aspects, the placement indication may also indicate an orientation of the antenna modules with respect to UE 115. For example, the placement indication may indicate that an antenna module is placed on the back face of UE 115 perpendicular to the short edge, or perpendicular to the long edge.

In aspects, the one or more metrics associated with antenna module 306 determined by UE 115 may include an indication of a type of antenna elements in each antenna module of antenna module 306, as well as the number of ports configured for the UE. For example, each antenna module of antenna module 306 may include antenna elements of a different type. The different antenna element types may include dual-polarized patch, single polarization end-fire dipole, etc. UE 115 may determine that type of antenna elements in each antenna module of antenna module 306 and may include an indication of the type in metrics message 370. In addition, UE 115 may include an indication of the number of ports that are present in UE 115.

In aspects, the one or more metrics associated with antenna module 306 determined by UE 115 may include an indication of a number of antenna elements in each subarray of each antenna module of antenna module 306. In this manner, UE 115 may indicate to base station 105 (and/or to other UEs) a number of antenna elements in antenna module 306. For example, UE 115 may include in the one or more metrics an indication that antenna module 306 includes one or more subarrays and the configuration of each subarray. For example, UE 115 may indicate that antenna module 306 includes any combination of 1×4, 1×5, 1×6, 1×8, 2×4, 2×5, 2×6, 2×8, etc. antenna subarrays. In this manner, UE 115 may indicate the number of antenna elements in each subarray of each antenna module of antenna module 306. In some aspects, the indication of the number of antenna elements in each subarray may include an indication of a range of antenna elements. For example, UE 115 may indicate a >8, >16, etc. range, indicating that the number of antenna elements in a subarray is according to the range, instead of indicating the exact number of antenna elements.

In aspects, the one or more metrics associated with antenna module 306 determined by UE 115 may additionally or alternatively include an indication of an EIRP that may be realized with a number of combinations of antenna modules. For example, the one or more metrics may include an indication of a peak EIRP that may be realized with a single antenna module of antenna module 306, as well as with various groups of antenna modules. In this manner, UE 115 may indicate a peak EIRP that may be realized with various combinations of antenna modules. In some aspects, the indication may also or alternatively indicate an 80%, 50%, and/or 20% of EIRP (corresponding to these quantile values) that may be realized with a particular group of antenna modules. In some aspects, base station 105 may configure which percentile is most relevant for UE 115 to report, and/or may configure the number of antenna modules in the particular group for which the EIRP realized may be reported by UE 115. For example, base station 105 may configure UE 115 to report a percentile of the EIRP for a first group of antenna modules including a number configured by base station 105. UE 115 may then report, in the one or more metrics message 370, the percentile of the EIRP that may be realized using the number of antenna modules in the first group.

In aspects, the one or more metrics associated with antenna module 306 determined by UE 115 may include an indication of a boresight direction of each subarray of antenna module 306, as well as an indication of the nature of analog beamforming codebook feedback expected from UE 115. In aspects, these beamforming indications may further indicate the number of hierarchical levels that may be present in the beamforming codebook, as well as the number of beams in each hierarchical level. Furthermore, these beamforming indications may serve to determine an array gain variation across all the beams in particular or certain hierarchical levels, as well as an overlap region between particular beams in one hierarchical level and particular beams in a different hierarchical level.

In aspects, the one or more metrics associated with antenna module 306 determined by UE 115 may include an indication of a peak transmission and reception power consumed when using each of the antenna modules in antenna module 306 corresponding to peak EIRP. In aspects, this indication may allow base station 105 to determine an energy efficiency in transmit and/or receive mode to and/or from UE 115.

In aspects, the one or more metrics associated with antenna module 306 determined by UE 115 may also or alternatively include an indication of whether the UE operates on battery power or a fixed power source, and/or an indication of a type of thermal management employed by UE 115. For example, the one or more metrics may include an indication of whether UE 115 is connected to a fixed power source and thus may not be power limited, or operates in battery power, in which case UE 115 may be power limited. Base station 105 may use this information to perform operations based on the knowledge that UE 115 is power limited or not. An indication of the type of thermal management employed by UE 115 (e.g., a type of heat sink, cooling fans, etc.), may serve as an indication of the limitations of the thermal management capabilities of UE 115. In this manner, base station 105 may know whether UE 115 is thermal limited and may perform operations with respect to UE 115 in accordance with this knowledge.

During operation of wireless communications system 300, UE 115 may transmit metrics message 370 to base station 105. In aspects, metrics message 370 may include an indication of the one or more metrics determined by UE 115. In some aspects, UE 115 may transmit metrics message 370 to another UE, such as over a sidelink. In aspects, metrics message 370 may be included in a broadcast message transmitted to base station 105 in an uplink transmission. In some aspects, metrics message 370 may be transmitted to base station 105 during an initial establishment of a communication session between the UE and the base station, and may be transmitted as an RRC message or as a MAC-CE message.

In aspects, base station 105 may perform an activity based on the one or more metrics associated with antenna module 306 of UE 115, as indicated in metrics message 370. For example, in aspects, base station 105 may determine a number of antenna modules configured for UE 115, as well as the placement of the antenna modules within UE 115, based on the one or more metrics received from UE 115. Base station 105 may determine diversity contributions to spherical coverage from the different antenna modules of UE 115 based on the placement of the antenna modules within UE 115.

In aspects, base station 105 may determine a type of antenna element in each antenna module of antenna module 306, as well as the number of ports configured for the UE, based on the one or more metrics received from UE 115. Base station 105 may be enabled to more accurately allocate reference signal resources (e.g., sounding reference signal (SRS) resources) using the indication of the number of ports available at UE 115. For example, base station may avoid under-provisioning and/or over-provisioning resource for SRS based on the indication of the number of ports and/or the types of antenna elements from UE 115.

In aspects, base station 105 may determine a number of antenna elements in each sub array of each antenna module of antenna module 306, as well as an EIRP that may be realized with a particular combination of antenna modules, based on the one or more metrics received from UE 115. In aspects, base station 105 may perform TDD duty cycle control for UE 115 based on the number of antenna elements in each subarray of each antenna module of antenna module 306 and the EIRP that may be realized with the particular combination of antenna modules. For example, base station 105 may determine EIRP on the uplink based on the reported EIRP from UE 115, and may approximate a range of power control and/or rate control required for communications with UE 115.

In aspects, base station 105 may determine a boresight direction of each subarray of antenna module 306, as well as the nature of analog beamforming codebook feedback expected from UE 115, based on the one or more metrics received from UE 115. In aspects, these beamforming indications (e.g., information about a number of hierarchical levels that may be present in the beamforming codebook and a number of beams in each hierarchical level) may enable base station 105 to determine a number of channel state information (CSI)-reference signal (RS) resources that may need to be configured and/or granted to UE 115. Currently, there is no mechanism for a UE to request RS resources, and the beamforming indications described herein may serve as a request for CSI-RS resources from base station 105.

In aspects, base station 105 may determine whether UE 115 is operating on battery power or a fixed power source, and may determine a type of thermal management employed by UE 115. In aspects, the indication of whether UE 115 is connected to a fixed power source (and thus may not be power limited) or may be operating under battery power (and thus may be power limited) may be used by base station 105 to determine whether UE 115 is power limited or not. Base station 105 may then perform operations with respect to UE 115 accordingly. In aspects, base station 105 may determine whether to turn on or train all antenna panels may be based on the indication of the power and/or thermal condition, as well as on the indication of the number of antenna modules of antenna module 306, in order to balance performance and power consumption. For example, based on a determination that UE 115 is operating with a fixed power source, base station 105 may determine that UE 115 is not power limited, and may therefore determine to turn on all antenna elements as it may determine to trade off power consumption for performance.

Figure 4:
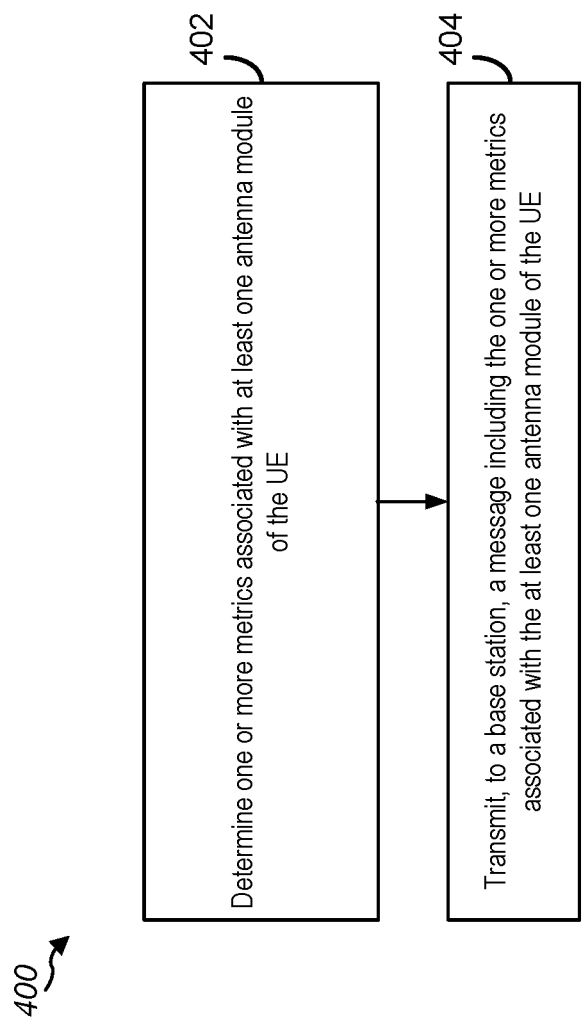
FIG. 4 is a flow diagram illustrating an example process that supports mechanisms for signaling metrics associated with antenna modules of a UE according to one or more aspects.
Figure 6:
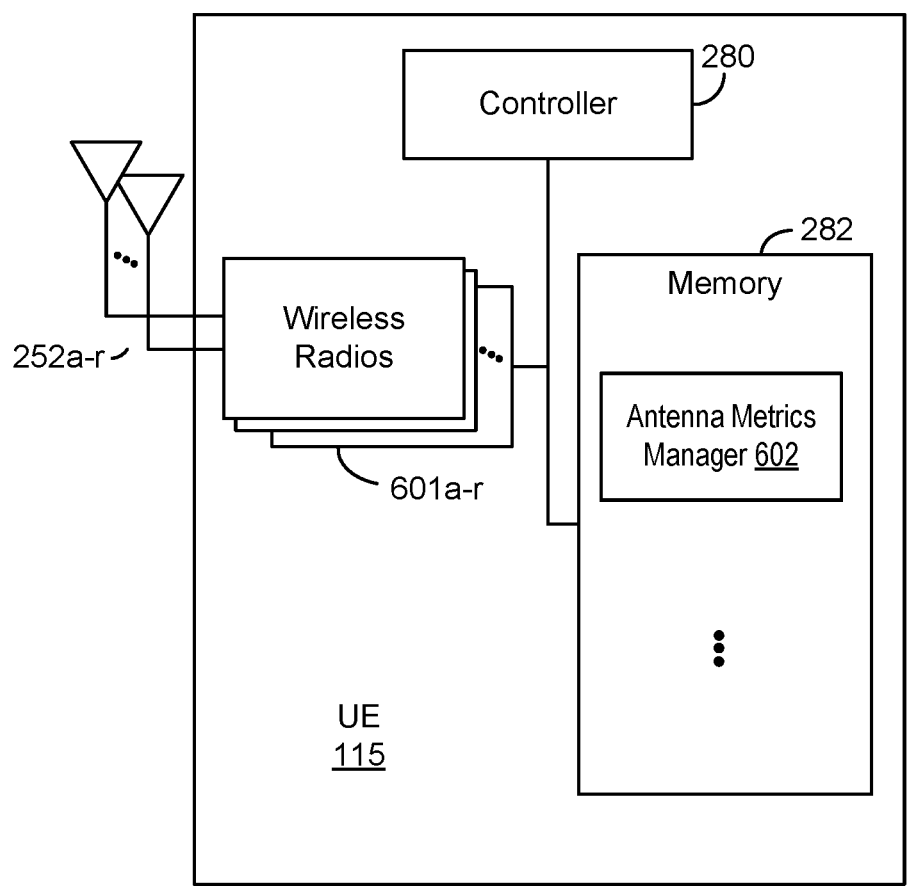
FIG. 6 is a block diagram of an example UE that supports mechanisms for signaling metrics associated with antenna modules of a UE according to one or more aspects.

FIG. 4 is a flow diagram illustrating an example process 400 that supports mechanisms for signaling metrics associated with antenna modules of a UE in a wireless communication system according to one or more aspects. Operations of process 400 may be performed by a UE, such as UE 115 described above with reference to FIGS. 1-3. For example, example operations (also referred to as "blocks") of process 400 may enable UE 115 to support mechanisms for signaling metrics associated with antenna modules of a UE. FIG. 6 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r includes various components and hardware, as illustrated in FIG. 2, including modulator/demodulators 254a-r, MIMO detector 256, receive processor 258, transmit processor 264, and TX MIMO processor 266.

At block 402 of process 400, a UE (e.g., UE 115) determines one or more metrics associated with at least one antenna module of the UE. In order to implement the functionality for such operations, UE 115, under control of controller/processor 280, executes antenna metrics manager 602, stored in memory 282. The functionality implemented through the execution environment of antenna metrics manager 602 allows for UE 115 to perform operations for determining one or more metrics associated with at least one antenna module of the UE according to the various aspects herein. In aspects, UE 115 may determine one or more metrics associated with at least one antenna module of the UE according to operations and functionality as described above with reference to UE 115 and as illustrated in FIG. 3.

At block 404 of process 400, UE 115 transmits, to a base station, a message including the one or more metrics associated with the at least one antenna module of the UE. In order to implement the transmit for such operations, UE 115, under control of controller/processor 280, may transmit a message including the one or more metrics associated with the at least one antenna module of the UE to base station 105 via wireless radios 601a-r and antennas 252a-r. In aspects, UE 115 may perform operations transmit a message including the one or more metrics associated with the at least one antenna module of the UE to base station 105 according to operations and functionality as described above with reference to transmitting UE 115a and as illustrated in FIG. 3.

Figure 5:
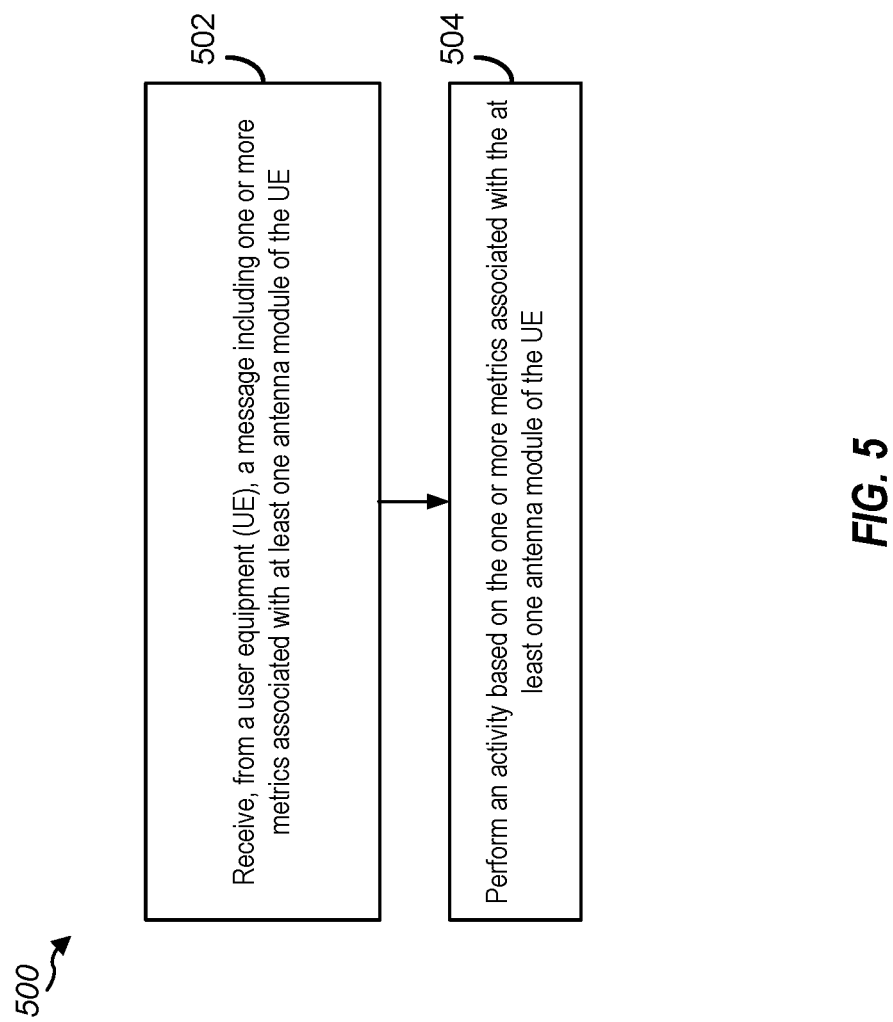
FIG. 5 is a flow diagram illustrating an example process that supports mechanisms for signaling metrics associated with antenna modules of a UE according to one or more aspects.
Figure 7:
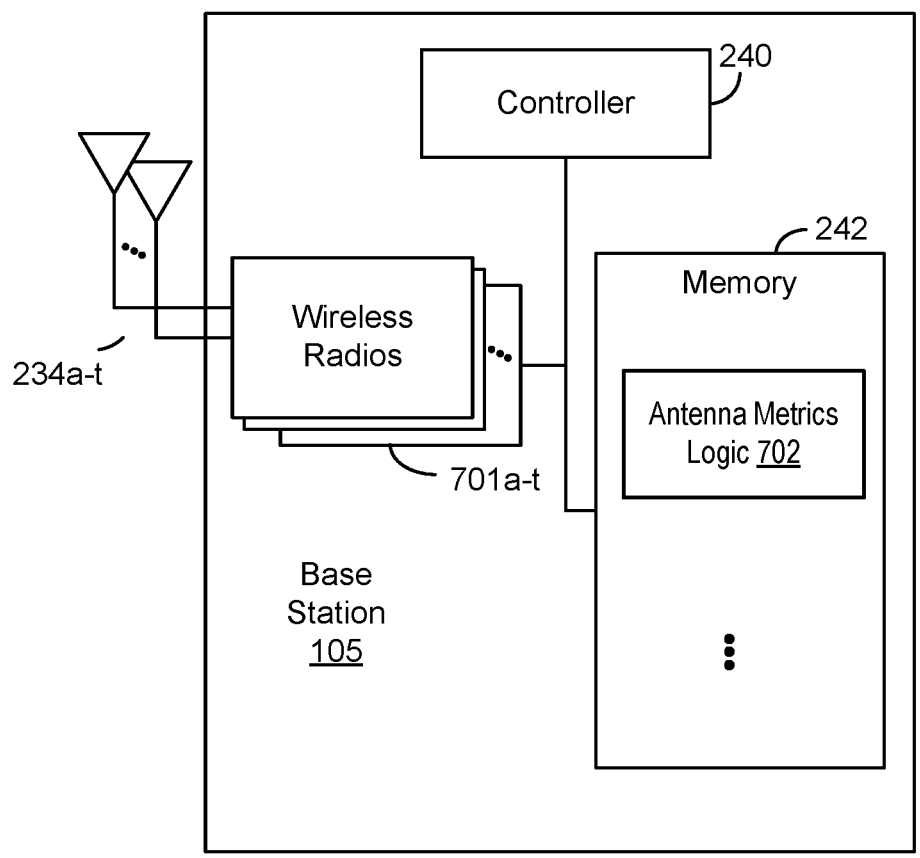
FIG. 7 is a block diagram of an example base station that supports mechanisms for signaling metrics associated with antenna modules of a UE according to one or more aspects.

FIG. 5 is a block diagram illustrating an example an example process 500 that supports mechanisms for signaling metrics associated with antenna modules of a UE in a wireless communication system according to one or more aspects. Operations of process 500 may be performed by a base station, such as base station 105 described above with reference to FIGS. 1-3, or described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, MIMO detector 236, receive processor 238, transmit processor 220, and TX MIMO processor 230.

At block 502 of process 500, a base station (e.g., base station 105) receives, from a UE (e.g., UE 115), a message including one or more metrics associated with at least one antenna module of the UE. In order to implement the functionality for such operations, the base station, under control of controller/processor 240, receives the message including one or more metrics associated with at least one antenna module of the UE from UE 115 via wireless radios 701a-r and antennas 234a-t. In aspects, base station 105 may perform operations to receive the message including one or more metrics associated with at least one antenna module of the UE according to operations and functionality as described above with reference to base station 105 and as illustrated in FIG. 3.

At block 502 of process 500, base station 105 performs an activity based on the one or more metrics associated with the at least one antenna module of the UE. In order to implement the functionality for such operations, base station 105, under control of controller/processor 240, executes antenna metrics logic 702, stored in memory 242. The functionality implemented through the execution environment of antenna metrics logic 702 allows for base station 105 to perform an activity based on the one or more metrics associated with the at least one antenna module of the UE according to the various aspects herein. In aspects, base station 105 may perform operations to perform an activity based on the one or more metrics associated with the at least one antenna module of the UE according to operations and functionality as described above with reference to base station 105 and as illustrated in FIG. 3.

In one or more aspects, techniques for supporting mechanisms for signaling metrics associated with antenna modules of a UE in a wireless communication system according to one or more aspects may include additional aspects, such as any single aspect or any combination of aspects described below or in connection with one or more other processes or devices described elsewhere herein. In a first aspect, supporting mechanisms for signaling metrics associated with antenna modules of a UE in a wireless communication system may include an apparatus configured to determine one or more metrics associated with at least one antenna module of the UE, and to transmit, to a base station, a message including the one or more metrics associated with the at least one antenna module of the UE. Additionally, the apparatus may perform or operate according to one or more aspects as described below. In some implementations, the apparatus includes a wireless device, such as a UE (e.g., a UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the one or more metrics include the number of antenna modules of the at least one antenna module and an indication of a placement of each antenna module of the antenna modules within the UE.

In a third aspect, alone or in combination with one or more of the first aspect or the second aspect, the one or more metrics include an indication of a type of antenna element of antenna elements in each antenna module of the at least one antenna module.

In a fourth aspect, alone or in combination with one or more of the first aspect through the third aspect, the type of antenna element includes a dual polarized patch antenna element and/or a single polarized end-fire dipole antenna element.

In a fifth aspect, alone or in combination with one or more of the first aspect through the fourth aspect, the one or more metrics include an indication of a number of antenna ports configured for the UE.

In a sixth aspect, alone or in combination with one or more of the first aspect through the fifth aspect, the one or more metrics include an indication of a number of antenna elements in each subarray of each antenna module of the at least one antenna module.

In a seventh aspect, alone or in combination with one or more of the first aspect through the sixth aspect, the indication of the number of antenna elements in each subarray includes a range.

In an eighth aspect, alone or in combination with one or more of the first aspect through the seventh aspect, the one or more metrics include an indication of a percentile of an EIRP realized using a number of antenna modules of the at least one antenna modules.

In a ninth aspect, alone or in combination with one or more of the first aspect through the eighth aspect, the one or more metrics include an indication of a boresight direction of each subarray of each antenna module of the at least one antenna module, and/or information on analog beamforming codebook feedback expected from the UE.

In a tenth aspect, alone or in combination with one or more of the first aspect through the ninth aspect, the information on analog beamforming codebook feedback includes an indication of a number of hierarchical levels present in a beamforming codebook, a number of beams in each hierarchical level of the hierarchical levels, an array gain variation across all beams in a first hierarchical level, and/or an overlap region between a first set of beams in one hierarchical level and a second set of beams in another hierarchical level.

In an eleventh aspect, alone or in combination with one or more of the first aspect through the tenth aspect, the one or more metrics include an indication of a peak transmission and reception power consumed when using each of the at least one antenna module corresponding to a peak EIRP.

In a twelfth aspect, alone or in combination with one or more of the first aspect through the eleventh aspect, the one or more metrics include an indication of a power condition of the UE, the power condition indicating whether the UE operates on battery power or a fixed power source, and/or an indication of a thermal condition of the UE, the thermal condition indication indicating a type of thermal management.

In a thirteenth aspect, alone or in combination with one or more of the first aspect through the twelfth aspect, transmitting the message including the one or more metrics includes transmitting the message including the one or more metrics to the base station in a broadcast message, an RRC message, and/or a MAC-CE message.

In a fourteenth aspect, alone or in combination with one or more of the first aspect through the thirteenth aspect, transmitting the message including the one or more metrics includes transmitting the message including the one or more metrics to the base station during an initial establishment of a communication session between the UE and the base station.

In a fifteenth aspect, alone or in combination with one or more of the first aspect through the fourteenth aspect, the techniques of the first aspect include transmitting a second message including the one or more metrics associated with the at least one antenna module of the UE to another UE over a sidelink.

In a sixteenth aspect, techniques for supporting mechanisms for signaling metrics associated with antenna modules of a UE in a wireless communication system may include an apparatus configured to receive, from a UE, a message including one or more metrics associated with at least one antenna module of the UE, and to perform an activity based on the one or more metrics associated with the at least one antenna module of the UE. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventeenth aspect, alone or in combination with one or more of the sixteenth aspect through the sixteenth aspect, the one or more metrics include the number of antenna modules of the at least one antenna module and an indication of a placement of each antenna module of the antenna modules within the UE.

In an eighteenth aspect, alone or in combination with one or more of the sixteenth aspect through the seventeenth aspect, the one or more metrics include an indication of a type of antenna element of antenna elements in each antenna module of the at least one antenna module.

In a nineteenth aspect, alone or in combination with one or more of the sixteenth aspect through the eighteenth aspect, the type of antenna element includes a dual polarized patch antenna element and/or a single polarized end-fire dipole antenna element.

In a twentieth aspect, alone or in combination with one or more of the sixteenth aspect through the nineteenth aspect, the one or more metrics include an indication of a number of antenna ports configured for the UE.

In a twenty-first aspect, alone or in combination with one or more of the sixteenth aspect through the twentieth aspect, the one or more metrics include an indication of a number of antenna elements in each subarray of each antenna module of the at least one antenna module.

In a twenty-second aspect, alone or in combination with one or more of the sixteenth aspect through the twenty-first aspect, the indication of the number of antenna elements in each subarray includes a range.

In a twenty-third aspect, alone or in combination with one or more of the sixteenth aspect through the twenty-second aspect, the one or more metrics include an indication of a percentile of an EIRP realized using a number of antenna modules of the at least one antenna modules.

In a twenty-fourth aspect, alone or in combination with one or more of the sixteenth aspect through the twenty-third aspect, the one or more metrics include an indication of a boresight direction of each subarray of each antenna module of the at least one antenna module, and/or information on analog beamforming codebook feedback expected from the UE.

In a twenty-fifth aspect, alone or in combination with one or more of the sixteenth aspect through the twenty-fourth aspect, the information on analog beamforming codebook feedback includes an indication of a number of hierarchical levels present in a beamforming codebook, a number of beams in each hierarchical level of the hierarchical levels, an array gain variation across all beams in a first hierarchical level, and/or an overlap region between a first set of beams in one hierarchical level and a second set of beams in another hierarchical level.

In a twenty-sixth aspect, alone or in combination with one or more of the sixteenth aspect through the twenty-fifth aspect, the one or more metrics include an indication of a peak transmission and reception power consumed when using each of the at least one antenna module corresponding to a peak EIRP.

In a twenty-seventh aspect, alone or in combination with one or more of the sixteenth aspect through the twenty-sixth aspect, the one or more metrics include an indication of a power condition of the UE, the power condition indicating whether the UE operates on battery power or a fixed power source, and/or an indication of a thermal condition of the UE, the thermal condition indication indicating a type of thermal management.

In a twenty-eighth aspect, alone or in combination with one or more of the sixteenth aspect through the twenty-seventh aspect, receiving the message including the one or more metrics includes receiving the message including the one or more metrics to the base station in a broadcast message, an RRC message, and/or a MAC-CE message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   a processing system that includes one or more processors and one or more memories coupled with the one or more processors, the processing system configured to:
   determine, by a user equipment (UE), one or more metrics associated with at least one antenna module of the UE, the one or more metrics including information on analog beamforming codebook feedback expected from the UE, and the information on analog beamforming codebook feedback including an indication of a number of hierarchical levels present in a beamforming codebook; and
   initiate transmission, to a base station, of a message including the one or more metrics associated with the at least one antenna module of the UE.

2. The apparatus of claim 1, wherein the one or more metrics further include a number of antenna modules of the at least one antenna module and an indication of a placement of each antenna module of the antenna modules within the UE.

3. The apparatus of claim 1, wherein the one or more metrics further include an indication of a type of antenna element of antenna elements in each antenna module of the at least one antenna module.

4. The apparatus of claim 3, wherein the type of antenna element includes one or more of: a dual polarized patch antenna element or a single polarized end-fire dipole antenna element.

5. The apparatus of claim 1, wherein the one or more metrics further include an indication of a number of antenna ports configured for the UE.

6. The apparatus of claim 1, wherein the one or more metrics further include an indication of a number of antenna elements in each subarray of each antenna module of the at least one antenna module, and wherein the indication of the number of antenna elements in each subarray includes a range of the antenna elements.

7. The apparatus of claim 1, wherein the one or more metrics further include an indication of a percentile of an effective isotropic radiated power (EIRP) realized using a number of antenna modules of the at least one antenna module.

8. The apparatus of claim 1, wherein the one or more metrics further include an indication of a boresight direction of each subarray of each antenna module of the at least one antenna module.

9. The apparatus of claim 1, wherein the information on analog beamforming codebook feedback further includes an indication of one or more of:
   a number of beams in each hierarchical level of the hierarchical levels;
   an array gain variation across all beams in a first hierarchical level; or
   an overlap region between a first set of beams in one hierarchical level and a second set of beams in another hierarchical level.

10. The apparatus of claim 1, wherein the one or more metrics further include an indication of a peak transmission and reception power consumed when using each of the at least one antenna module corresponding to a peak effective isotropically radiated power (EIRP).

11. The apparatus of claim 1, wherein the one or more metrics further include one or more of:
    an indication of a power condition of the UE, the power condition indicating whether the UE operates on battery power or a fixed power source; or
    an indication of a thermal condition of the UE, the indication of the thermal condition indicating a type of thermal management.

12. The apparatus of claim 1, wherein the processing system configured to initiate the transmission of the message comprises the processing system further configured to initiate the transmission of the message in one or more of:
    a broadcast message;
    a radio resource control (RRC) message; or
    a medium access control (MAC)-control element (CE) message.

13. The apparatus of claim 1, wherein the processing system configured to initiate the transmission of the message comprises the processing system further configured to initiate the transmission of the message during an initial establishment of a communication session between the UE and the base station.

14. The apparatus of claim 1, wherein the processing system is further configured to:
    initiate transmission of a second message including the one or more metrics associated with the at least one antenna module of the UE to another UE over a sidelink.

15. An apparatus for wireless communication, comprising:

a processing system that includes one or more processors and one or more memories coupled with the one or more processors, the processing system configured to:

initiate receipt, by a base station, from a user equipment (UE), a message including one or more metrics associated with at least one antenna module of the UE, the one or more metrics including information on analog beamforming codebook feedback expected from the UE, and the information on analog beamforming codebook feedback including an indication of a number of hierarchical levels present in a beamforming codebook; and perform, by the base station, an activity based on the one or more metrics associated with the at least one antenna module of the UE.

16. The apparatus of claim 15, wherein the one or more metrics further include a number of antenna modules of the at least one antenna module and an indication of a placement of each antenna module of the antenna modules within the UE.

17. The apparatus of claim 15, wherein the one or more metrics further include an indication of a type of antenna element of antenna elements in each antenna module of the at least one antenna module.

18. The apparatus of claim 17, wherein the type of antenna element includes one or more of: a dual polarized patch antenna element or a single polarized end-fire dipole antenna element.

19. The apparatus of claim 15, wherein the one or more metrics further include an indication of a number of antenna ports configured for the UE.

20. The apparatus of claim 15, wherein the one or more metrics further include an indication of a number of antenna elements in each subarray of each antenna module of the at least one antenna module, and wherein the indication of the number of antenna elements in each subarray includes a range of the antenna elements.

21. The apparatus of claim 15, wherein the one or more metrics further include an indication of a percentile of an effective isotropic radiated power (EIRP) realized using a number of antenna modules of the at least one antenna module.

22. The apparatus of claim 15, wherein the one or more metrics further include
an indication of a boresight direction of each subarray of each antenna module of the at least one antenna module.

23. The apparatus of claim 22, wherein the information on analog beamforming codebook feedback further includes an indication of one or more of:

a number of beams in each hierarchical level of the hierarchical levels;

an array gain variation across all beams in a first hierarchical level; or an overlap region between a first set of beams in one hierarchical level and a second set of beams in another hierarchical level.

24. The apparatus of claim 15, wherein the one or more metrics further include an indication of a peak transmission and reception power consumed when using each of the at least one antenna module corresponding to a peak effective isotropically radiated power (EIRP).

25. The apparatus of claim 15, wherein the one or more metrics further include one or more of:

an indication of a power condition of the UE, the power condition indicating whether the UE operates on battery power or a fixed power source; or an indication of a thermal condition of the UE, the indication of the thermal condition indicating a type of thermal management.

26. The apparatus of claim 15, wherein the processing system configured to initiate receipt of the message includes the processing system further configured to initiate receipt of the message in one or more of:

a broadcast message;

a radio resource control (RRC) message; or a medium access control (MAC)-control element (CE) message.

27. A method of wireless communication performed by a user equipment (UE), the method comprising:

determining one or more metrics associated with at least one antenna module of the UE, the one or more metrics including information on analog beamforming codebook feedback expected from the UE, and the information on analog beamforming codebook feedback including an indication of a number of hierarchical levels present in a beamforming codebook; and transmitting, to a base station, a message including the one or more metrics associated with the at least one antenna module of the UE.

28. The method of claim 27, wherein the information on analog beamforming codebook feedback further includes an indication of a number of beams in each hierarchical level of the hierarchical levels.

29. The method of claim 27, wherein the information on analog beamforming codebook feedback further includes an array gain variation across all beams in a first hierarchical level.

30. A method of wireless communication performed by a base station, the method comprising:

receiving, from a user equipment (UE), a message including one or more metrics associated with at least one antenna module of the UE, the one or more metrics including information on analog beamforming codebook feedback expected from the UE, and the information on analog beamforming codebook feedback including an indication of a number of hierarchical levels present in a beamforming codebook; and performing an activity based on the one or more metrics associated with the at least one antenna module of the UE.

31. The method of claim 30, wherein the information on analog beamforming codebook feedback further includes a number of beams in each hierarchical level of the hierarchical levels.

32. The method of claim 30, wherein the information on analog beamforming codebook feedback further includes an overlap region between a first set of beams in one hierarchical level and a second set of beams in another hierarchical level.

* * * * *